Sept. 26, 1961 M. RUBIN 3,002,112

DRIVING CIRCUIT FOR ELECTROMECHANICAL SWITCHING DEVICES

Filed July 22, 1959 2 Sheets-Sheet 1

INVENTOR.
MARTIN RUBIN

BY Edward A. Sokolski

AGENT

Sept. 26, 1961 M. RUBIN 3,002,112

DRIVING CIRCUIT FOR ELECTROMECHANICAL SWITCHING DEVICES

Filed July 22, 1959 2 Sheets-Sheet 2

INVENTOR.
MARTIN RUBIN

BY Edward A. Sokolski

AGENT 3,002,112

DRIVING CIRCUIT FOR ELECTROMECHANICAL SWITCHING DEVICES

Martin Rubin, Garden Grove, Calif., assignor to North American Aviation, Inc.
Filed July 22, 1959, Ser. No. 828,856
12 Claims. (Cl. 307—93)

This invention relates to driving circuits for electromechanical switching devices and more particularly to such a circuit which minimizes arcing, current surging, and other sources of radio frequency noise in such devices.

Many switching devices are now in use which involve the successive making and breaking of mechanical switch contacts in response to an electromagnetic motive device. Common problems of such switches are (1) arcing across the contacts as they make and break and (2) voltage surges in the circuit originating from decay current in the electromagnetic device when the control voltage is removed therefrom. Both of these effects produce electrical interference signals which can seriously impair the functioning of associated equipment. In addition, arcing across the contacts produces undesirable wear thereon. The device of this invention provides simple yet effective means for minimizing both contact arcing and voltage surges.

For examplary purposes, the device of this invention is described in conjunction with a stepping switch. Stepping switches are used quite widely in precision electronic equipment of a digital nature. Such digital equipment is particularly deleteriously affected by extraneous noise signals caused by arcing or voltage surge effects. It is therefore essential that such arcing and voltage surges which may be present in switching devices used in proximity to such equipment produce an absolute minimum of such noise signals. The device of this invention lowers the noise generation in stepping switches to the point where they can readily be utilized in conjunction with noise sensitive electronic devices such as digital computers.

The device of this invention accomplishes this end result by isolating the electrical circuit in which the stepping switch contacts and its associated interrupter contact (if any) are connected, from the electrical supply circuit for the electromagnetic motive means which may, for example, be a solenoid motor. Such isolation is accomplished by utilizing an electronic valve or switch having a control electrode which is connected in the switching contact circuitry and electron emitting and electron collecting electrodes which are connected in circuit with a power source and the electromagnetic motive means for driving the stepping switch. In this manner, the electromagnetic motive means current is eliminated from the stepping switch contacts. In addition, the electronic switch provides a discharge path for the inductive charge in the motive means which acts as a variable resistance to complement the flux decay of this electromagnetic device and thereby flattens out any voltage surge or spike which would otherwise be present.

It is therefore an object of this invention to provide an improved driving circuit for electromechanical switching devices.

It is a further object of this invention to minimize noise generation in electromechanical switching devices.

It is a still further object of this invention to minimize arcing across the contacts of stepping switches.

It is a still further object of this invention to minimize radio frequency surges and spikes which may be generated in stepping switch circuitry.

It is still a further object of this invention to compensatorily flatten out the decay voltage in magnetic drive circuitry used for stepping switches.

Other objects of this invention will become apparent from the following description taken in connection with the accompanying drawings in which.

Figure 1:
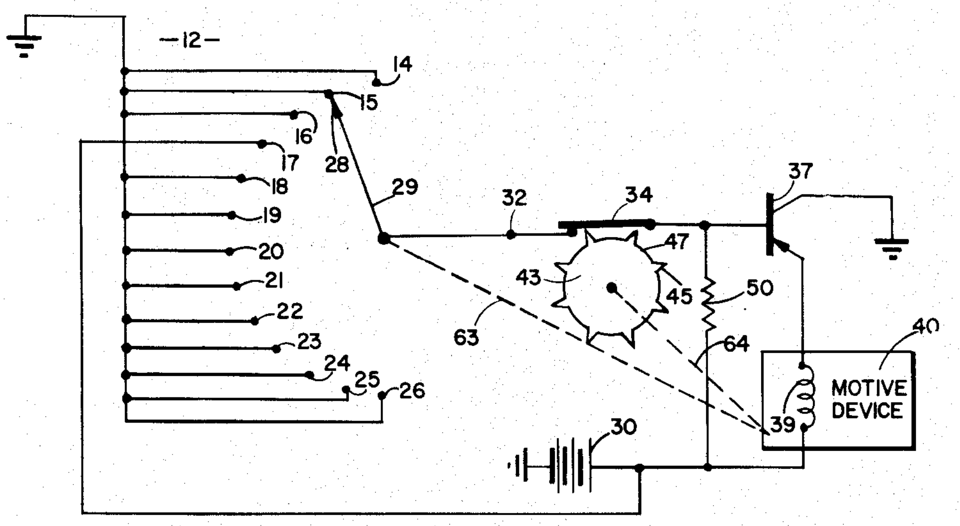
FIG. 1 is a schematic diagram of a first embodiment of the invention.

Referring to FIG. 1, a first embodiment of the invention is illustrated. Stepping switch 12 may be a conventional stepping switch in which a movable shaft 29 will step by step search for a "homing" position. This "homing" position will correspond to the engagement of movable contact 28 with a particular one of fixed contacts 14–26 which as to be shown later produces the proper "homing" combination. Shaft 29 may be mechanically coupled to one or more wafer switches so that the position of this shaft will determine which of the fixed and movable contacts of these wafer switches will be engaged. Coupling of signals through these wafer switches may thereby be determined by the position of the movable shaft 29 of the stepping switch. Stepping switch 12 has a plurality of fixed contacts 14 through 26 and a movable contact 28 which is positioned to successively engage the fixed contacts. All of the fixed contacts, except 17, are connected to ground. It is to be understood, of course, that ordinarily there would be some sort of switching circuitry in the associated electronic device which would effect such connections. Contact 17 is connected to the positive terminal of power source 30, the negative terminal of this source being grounded. Here again, contact 17 ordinarily would be connected to power source 30 through switching circuitry of the associated electronic equipment. The connection of contact 17 to the positive terminal of power source 30 and all the other fixed contacts to ground or the negative terminal of power source 30 might, for example, represent a particular switching combination of an associated control device. Contact 17 in this instance may be called the "homing" contact, that is the contact at which movable contact 28 will eventually come to rest.

Movable contact 28 is connected to terminal 32 which in turn is connected through the contacts of mechanical interrupter switch 34 to the base of an electronic switch such as transistor 37. The collector of this transistor is connected to ground while the emitter is connected through the electromagnetic coil 39 of motive device 40 to the positive terminal of power source 30. Motive device 40 may, for example, be a rotary magnet or a solenoid motor. A device such as type 11 stepping switch manufactured by C. P. Clare & Co., Chicago, Ill. is exemplary of one type of motive device as combined with a stepping switch which may be used. The mechanical output of motive device 40 is coupled by means of mechanical drive 63 to drive shaft 29 and thereby moves movable contact 28 into successive engagement with fixed contacts 14 through 26. Mechanical drive 64 moves cam device 43 in synchronism with movable contact 28.

Cam device 43 has an actuator portion comprising raised sections 45 and recessed sections 47. Raised sections 45 engage the movable contact of interrupter switch 34 intermittently as cam 43 rotates. Such action alternately engages and disengages the movable and fixed contacts of switch 34, these contacts being forced into engagement by appropriate and conventional spring action (not shown) when the recessed sections 47 are opposite the movable portion of the switch. The motion of cam device 43 is synchronized with that of movable contact 28 so that a raised section 45 disengages the contacts of switch 34 as movable contact 28 moves from fixed contact to fixed contact, each raised section 45 disengaging the contacts while the movable contact 28 is in between a pair of fixed contacts. Conventional stepping switches using a pawl and ratchet are exemplary of the type which may be used.

As has been pointed out, in prior arrangements, the supply current for motive device 40 would pass through both the contacts of switch 12 and interrupter switch 34. In the device of the invention, it can be seen that the power is supplied to motive device 40 in a circuit which is effectively isolated from the switch contacts.

The device operates as follows: For any position of movable contact 28, except when it is in engagement with contact 17, ground potential will be connected through switches 12 and 34 to the base of transistor 37. Transistor 37 being a PNP type having a positive voltage at its emitter and its collector grounded will conduct with a ground potential at its base. Motive device 40 being in the emitter supply circuit of transistor 37 will carry the full transistor emitter current. Motive device 40 will therefore be actuated and will rotate cam device 43 and movable contact 28 of stepping switch 12 by means of mechanical drives 64 and 63 respectively. Such motion will continue step by step in conjunction with the interruption of interrupter switch 34 by cam device 43 until movable contact 28 engages fixed contact 17. At this time, a positive voltage will be applied to the base of transistor 37 through the switch contacts which zero biases this transistor and thereby cuts it off. With the cut off of transistor 37, power will no longer be supplied to motive device 40 and movable contact 28 will remain in engagement with fixed contact 17. In this manner, the desired "homing" is accomplished.

If the current passing through motive device 40 and transistor 37 is designated as $I_m$, it can be shown that the current through the contacts of stepping switch 12 and interrupter switch 34 to the base of transistor 37 is substantially equal to $$\frac{I_m}{\beta}$$

$\beta$ is conventionally called the transport factor and represents the ratio of transistor collector current to base current. For typically operated transistors, $\beta$ generally ranges from 20 to 100 in the linear regions of operation. Therefore, in the device of the invention there is a considerably lower base and switch contact current than emitter and motive device current. In this manner, adequate current can be supplied to properly operate motive device 40 while at the same time the current through stepping switch 12 and interrupter switch 34 is kept to a minimum thereby minimizing arcing and its resultant interference signal.

When voltage is removed from the solenoid coil 39 of motive device 40 (while the movable contact 28 is in between the fixed contacts and when movable contact 28 finally comes to rest at fixed contact 17), the residual current in solenoid 39 will decay as a function of the normal transient curve, $$e\frac{R_t}{L}$$

where L represents the inductance of solenoid coil 39, R represents the resistance in the coil's discharge path, $e$ is the natural logarithm base and $t$ represents time. This discharge path comprising R includes the D.-C. resistance of coil 39, resistor 50 and the effective resistance presented by transistor 37 when the movable contact 28 is in between fixed contacts and all of this resistance but that of resistor 50 when the movable contact comes to rest at fixed contact 17. The collapsing field in solenoid winding 39 generates a voltage across this coil which is positive on the side connected to the emitter and negative on the side of the coil closest to the base of transistor 37. This voltage forward biases the emitter to base junction of transistor 37 thereby causing this transistor to conduct and provide a discharge path for solenoid winding 39. It can be seen that the shunt resistance seen by solenoid winding 39 is a function of the effective emitter input resistance of transistor 37. As the voltage across solenoid coil 39 decays, the effective resistance in the discharge path through transistor 37 will vary inversely thereto in a complementary manner. This is because the decay voltage across coil 39 is applied as forward bias between the emitter-base junction of the transistor. The current conduction and effective resistance of the transistor will vary with this bias voltage. As this forward bias voltage decreases, the current through transistor 37 will decrease in response to this decay voltage and the effective resistance of transistor 37 will increase. Therefore, the effective resistance of the discharge path through transistor 37 will complement the decay current flowing from solenoid coil 39 greatly tending to flatten out the voltage generated, eliminating sharp spikes or voltage surges which would otherwise be present.

Figure 2:
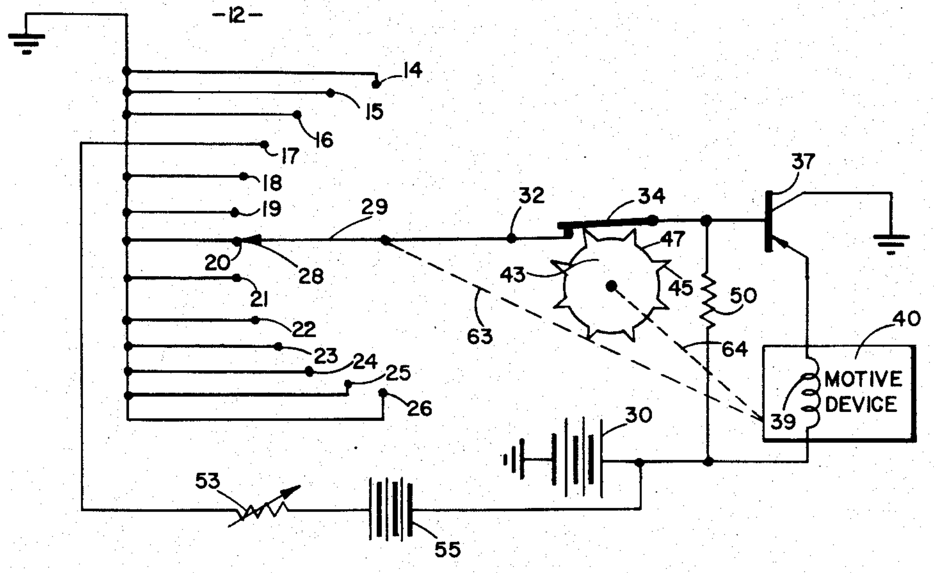
FIG. 2 is a schematic diagram of a second embodiment of the invention.

A second embodiment of the invention is illustrated in FIG. 2. This second embodiment is identical to the first except for the addition of variable resistor 53 and D.-C. power source 55 between fixed contact 17 and solenoid coil 39. This second embodiment functions similarly to the first except for the capability of the adjustment of the effective resistance provided by transistor 37 in the solenoid coil discharge path when the movable contact 28 comes to its final resting position at contact 17. A back biasing voltage is provided for transistor 37 by power source 55 to limit the forward biasing effect of the decay voltage across solenoid coil 39. The magnitude of this back biasing voltage may be adjusted by means of variable resistor 53. By appropriate adjustment of resistor 53, an operation region for transistor 37 which affords optimum complementation to the solenoid decay current may be selected. It is to be noted that the back biasing voltage provided by source 55 tends to prevent the transistor from saturating at the start of the transient current decay.

An NPN type transistor can readily be substituted for the PNP type illustrated in FIGS. 1 and 2 by appropriately rearranging the polarities of the voltages as applied to the transistor. Similarly other electronic switching devices having control, electron emitting, and electron collecting electrodes may be utilized in place of transistors. For example, a vacuum tube may be used wherein the grid of such tube corresponds to the transistor base or control electrode, the plate of the vacuum tube corresponds to the transistor collector or electron collecting electrode, while the cathode of the vacuum tube corresponds to the transistor emitter or electron emitting electrode.

Figure 3:
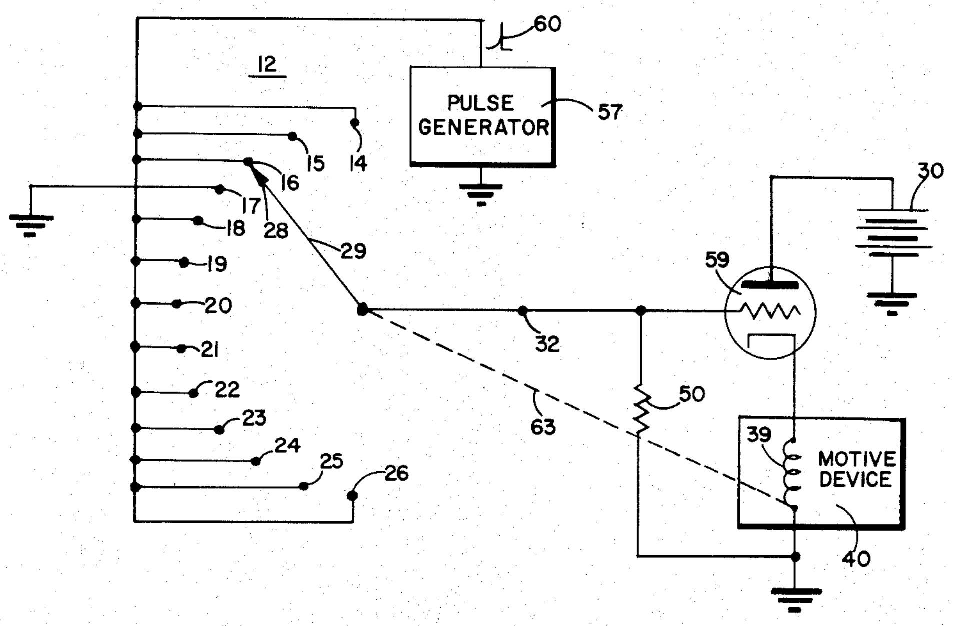
FIG. 3 is a schematic diagram of a third embodiment of the invention.

A third embodiment of the invention utilizing a vacuum tube in place of the transistor of FIG. 1 is illustrated in FIG. 3. This third embodiment also does not utilize any interrupter switch or its associated cam device, but instead a pulse generator 57 is used to generate the interrupting stepping signal. Positive pulses 60 are generated by pulse generator 57 at any desired stepping frequency. These positive pulses are fed to all of the fixed contacts of stepping switch 12 except for the "homing" contact 17. As already pointed out, the arrangement of the connections of the fixed contacts is generally determined by the internal circuitry of the device with which the stepping switch is utilized. When movable contact 28 is in engagement with any of the fixed contacts, except for contact 17, the positive pulse will be fed through the stepping switch 12 to the grid of vacuum tube 59. The grid of vacuum tube 59 is biased by means of grid biasing resistor 50 so that the tube will conduct with the application of a positive pulse 60 of a predetermined minimum amplitude. Therefore, tube 59 will conduct each time a pulse 60 is fed through the stepping switch 12. Each time tube 59 conducts, current will be drawn through solenoid 39 of motive device 40 thereby actuating this motive device and causing the movable contact 28 to be moved to a succeeding fixed contact by means of mechanical linkage 63. In accordance with input pulses 60 fed to the grid of tube 59 through the path provided by the engagement between movable contact 28 and any one of the fixed contacts of stepping switch 12 except for contact 17, the movable contact will be advanced step by step until it reaches contact 17. Contact 17 is grounded and therefore no pulse will be fed through to vacuum tube 59. The movable contact will therefore remain at rest in this position.

Vacuum tube 59 operates similarly to transistor 37 (FIG. 1) in (1) isolating the stepping switch circuit from the motive device actuating circuit and thereby minimizing the current passing through the stepping switch contacts and (2) providing a complementary discharge path for the decay current flowing from solenoid coil 39. Vacuum tube 59 will similarly be forward biased (negative on cathode connected side of coil 39 and positive on the grid connected side) and caused to conduct by the voltage generated by the decay current in coil 39. The effective internal resistance of this vacuum tube will similarly increase as the decay voltage across solenoid 39 decreases thereby providing a discharge path for the decay current which will tend to flatten out voltage spikes or voltage surges across the solenoid coil.

It thus can be seen that the device of this invention provides a simple yet effective means for minimizing contact arcing and spikes or surge voltages produced in magnetically driven switching devices. It thereby effectively minimizes wear and tear on the electrical switch contacts and keeps interference noise generated in such circuitry to an absolute minimum.

While the invention has been described and illustrated in detail, it is to be clearly understood that the same is by way of illustration and example only and is not to be taken by way of limitation, the spirit and scope of this invention being limited only by the terms of the appended claims.

I claim:

1. A driving circuit for an electromechanical switching device having a plurality of contacts and at least one movable contact comprising, electromagnetic drive means for moving said movable contact into successive engagement with said fixed contacts, a power source, and electronic switch means for operatively connecting said power source to said electromagnetic drive means in response to the voltage at said movable contact, said electronic switch means having a control electrode connected to said movable contact, said switch means being connected in circuit between said electromechanical switching device and said power source to effect isolation of electrical currents in said electromagnetic drive means from all said contacts.

2. In combination, a switch having at least one movable contact and a plurality of fixed contacts, electromagnetic motive means for successively moving said movable contact into engagement with a separate one of said fixed contacts, an electronic valve having control, electron emitting and electron collecting electrodes, said control electrode being connected to said movable contact, and a power source, said electromagnetic motive means being connected between one terminal of said power source and one of said electron emitting and collecting electrodes, the other terminal of said power source being connected to the other of said electron emitting and collecting electrodes.

3. In combination, a switch having a plurality of fixed contacts and at least one movable contact; means for moving said movable contact into successive engagement with a separate one of said fixed contacts, said means for moving comprising an electromagnetic motive device; an electronic switch having a control electrode, an electron emitting electrode, and an electron collecting electrode, said control electrode being connected to said movable contact of said switch; and a power source, said motive device being connected between one terminal of said power source and one of said electron emitting and electron collecting electrodes, the other of said electron emitting and electron collecting electrodes being connected to the other terminal of said power source.

4. The device as recited in claim 3 wherein said electronic switch is a transistor.

5. The device as recited in claim 3 wherein said electronic switch is a vacuum tube.

6. In a stepping switch, a driving circuit comprising in combination a motive device having an energizing winding, a source of potential, an electronic switch connected in series circuit with said source and winding, a normally closed mechanical switch connected to be opened by said motive device, and means including said mechanical switch for closing said electronic switch when said mechanical switch is closed.

7. In a mechanical switching apparatus, a motive device having an inductive energizing coil, a movable switch contact connected to be driven by said motive device in response to energization of said coil, a source of potential, a normally open electronic switch connected in series circuit with said source and coil, means for temporarily biasing said electronic switch to conduction whereby said coil is temporarily energized by current conducted through said electronic switch from said source, and means responsive to energy inductively stored in said coil upon termination of its energization for biasing said electronic switch toward conduction whereby energy surges due to said inductively stored energy are minimized.

8. In combination, a switch having a plurality of fixed contacts, each said contact having a predetermined electrical potential applied thereto and at least one movable contact; means for moving said movable contact into successive engagement with a separate one of said fixed contacts, said means for moving comprising an electromagnetic motive device; a transistor having base, collector and emitter electrodes, the base electrode of said transistor being connected to said movable contact of said switch; and a power source, said motive device being connected between one terminal of said power source and the emitter electrode of said transistor, the collector electrode of said transistor being connected to the other terminal of said power source.

9. The device as recited in claim 8 and additionally comprising an interrupter switch connected between said base electrode of said transistor and said movable contact of said switch, said interrupter switch having a fixed and a movable contact, said interrupter switch movable contact being connected to said motive device to move into alternate engagement and disengagement with said interrupter switch fixed contact in response to said motive means.

10. A driving circuit for a stepping switch having a plurality of fixed contacts and at least one movable contact comprising, a motive device, a transistor having emitter collector and base electrodes, an interrupter switch having a fixed and a movable contact, a cam device having an actuator portion comprising alternate raised and recessed sections, said cam device being rotatably mounted with said actuator portion in engagement with the movable contact of said interrupter switch, the mechanical output of said motive device being coupled to synchronously drive said cam device and said movable contact of said stepping switch, said stepping switch movable contact being driven into successive engagement with said stepping switch fixed contacts, a power source, one terminal of said power source being coupled to all but one of said stepping switch fixed contacts and the collector of said transistor, said one fixed contact of said stepping switch being coupled to the other terminal of said power source, said motive device being connected between the other terminal of said power source and the emitter of said transistor, one contact of said interrupter switch being connected to the base of said transistor, the other contact of said interrupter switch being connected to the movable contact of said stepping switch, and a resistor connected between the base of said transistor and said other terminal of said power source.

11. The device as recited in claim 10 and additionally comprising a second power source and a variable resistor, said second power source and variable resistor being connected in series with each other, wherein said one fixed contact of said stepping switch is coupled to the other terminal of said power source through said series connected variable resistor and second power source.

12. A driving circuit for a stepping switch having a plurality of fixed contacts and at least one movable contact comprising, an electromagnetic motive device, an electronic valve having control, electron emitting, and electron collecting electrodes, the mechanical output of said motive device being coupled to drive said movable contact of said stepping switch into successive engagement with each of said fixed contacts, a power source, one terminal of said power source being connected to one of said electron collecting and electron emitting electrodes of said electronic valve, said motive device being connected between the other terminal of said power source and the other of said electron emitting and electron collecting electrodes of said power source, said control electrode of said electronic valve being connected to said movable contact of said stepping switch, and a pulse generator, the output of said pulse generator being connected to all but one of said fixed contacts.

References Cited in the file of this patent

UNITED STATES PATENTS

| | | |
|---|---|---|
| 1,966,077 | Nyman | July 10, 1934 |
| 2,404,001 | Smith | July 16, 1946 |
| 2,444,210 | Lauricella | June 29, 1948 |